United States Patent [19]

Kennedy

[11] Patent Number: 4,886,228

[45] Date of Patent: Dec. 12, 1989

[54] ADJUSTABLE MOUNTING BRACKET

[75] Inventor: Robert D. Kennedy, Northville, Mich.

[73] Assignee: Ford Motor Company, Dearborn, Mich.

[21] Appl. No.: 242,101

[22] Filed: Sep. 9, 1988

[51] Int. Cl.$^4$ .............................................. F16L 3/08
[52] U.S. Cl. ................................ 248/74.1; 24/115 A; 24/129 B; 24/545; 248/71; 248/216.1
[58] Field of Search ................. 248/74.1, 74.2, 73, 248/71, 65, 67.7, 216.1, 220.2, 222.3; 24/16 R, 18, 15 A, 129 B, 129 W, 129 R, 545, 563

[56] References Cited

U.S. PATENT DOCUMENTS

| | | |
|---|---|---|
| 1,808,328 | 6/1931 | Thomson ............................ 248/74.1 |
| 2,896,889 | 7/1959 | Hershberger et al. ................ 248/71 |
| 2,941,768 | 6/1960 | Elms et al. ............................ 248/71 |
| 2,974,916 | 3/1961 | Richey .................................. 248/71 |
| 3,244,803 | 4/1966 | Becker et al. ....................... 174/154 |
| 3,252,677 | 5/1966 | Raymond ......................... 248/68.1 |
| 4,735,387 | 4/1988 | Hirano et al. ......................... 248/71 |
| 4,784,358 | 11/1988 | Kohut ............................... 248/71 X |

Primary Examiner—Ramon O. Ramirez
Attorney, Agent, or Firm—D. M. Stock; C. L. Sadler

[57] ABSTRACT

An adjustable cable mounting bracket for automobile bodies is formed as a unitary structure in which a barbed locating member and a partially cylindrical backing member are hingedly connected to a slotted adjusting member to be folded into position where the resulting bracket assembly is rotatably mounted in an automotive body panel and provides for circumferential and axial movement of a portion of a flexible conduit or cable received in the bracket in snap-fit relationship.

11 Claims, 2 Drawing Sheets

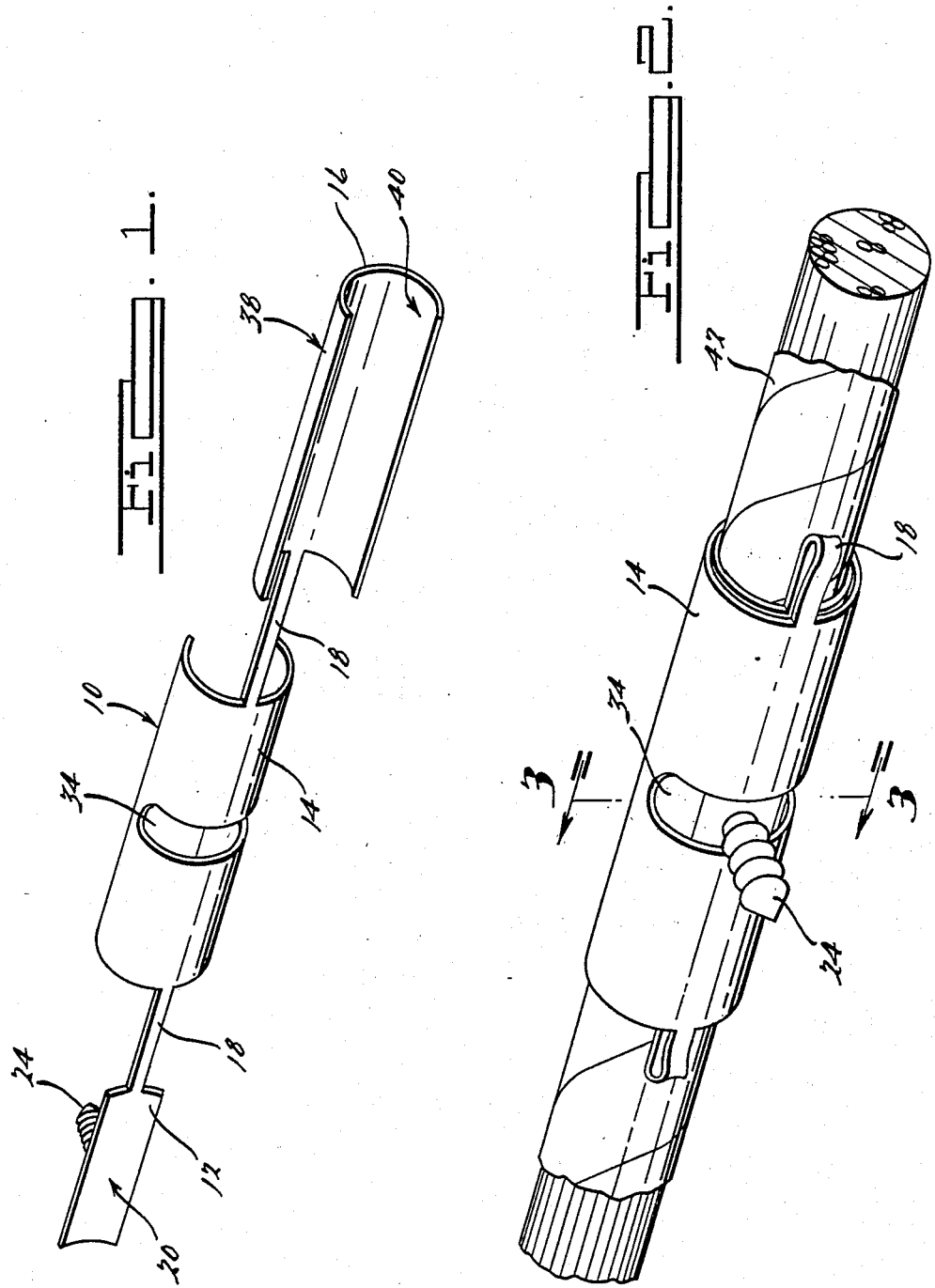

ADJUSTABLE MOUNTING BRACKET

BACKGROUND OF THE INVENTION

The present invention relates generally to mounting brackets for flexible conduits and more particularly to such brackets configured for use in mounting flexible conduits to fixed panels such as automotive body panels.

DESCRIPTION OF THE PRIOR ART

The assembly of modern automotive vehicles necessarily requires the securing of relatively long and unwieldy flexible conduits such as electrical or mechanical cables or fluid hosing to panels of the automotive body. Of particular concern are bundles of wires in the form of wiring harnesses used to operatively electrically connect various components of the automobile. Clamps for holding cables fixed to a mounting surface have long been available in the automotive industry as well as other industries. U.S. Pat. No. 3,244,803 to Becker and U.S. Pat. No. 3,252,677 to Raymond are exemplary of the types of cable clamping devices or clips widely used. The prior art clips, however, suffer from the disadvantage that the flexibility of the cable itself and the manufacturing tolerances between the cable position and the position of the clamp or clip on the base structure or panel tend to require significant manipulation of the cable with respect to the clip for effecting installation. In the high volume production environment of the automotive industry, this requirement for manipulation brings inefficiency to the assembly process that is considered undesirable.

SUMMARY OF THE INVENTION

It is accordingly an object of the present invention to provide a mounting bracket for flexible conduits that provides adjustable positioning of a portion of the conduit with respect to an automotive body panel to which the bracket is mounted.

According to the main features of the present invention, the bracket is fixedly mounted to the panel in a rotatable fashion and the bracket is configured to provide axial and/or circumferential adjustability with respect to the mounting position. This adjustability permits accomodation for misalignments that may occur in attempting to route the conduit with respect to the panel.

According to another feature of the invention, the bracket is formed of mutually slidably engaged members having mounting surfaces for receiving the cable.

According to another feature of the invention, the slidably mounted members of the mounting bracket are formed as unitary molded portions hingedly connected to one another.

BRIEF DESCRIPTION OF THE DRAWINGS

These and other objects and features will become apparent to those skilled in the automotive body arts upon reading the following description with reference to the accompanying drawings in which:

FIG. 1 is a perspective view of a bracket according to the present invention with portions of the bracket arranged and positioned in their manufactured condition;

FIG. 2 is a perspective view of the bracket of the present invention illustrating the components of the bracket in their conduit mounting positions;

DESCRIPTION OF THE PREFERRED EMBODIMENT

Figure 3:
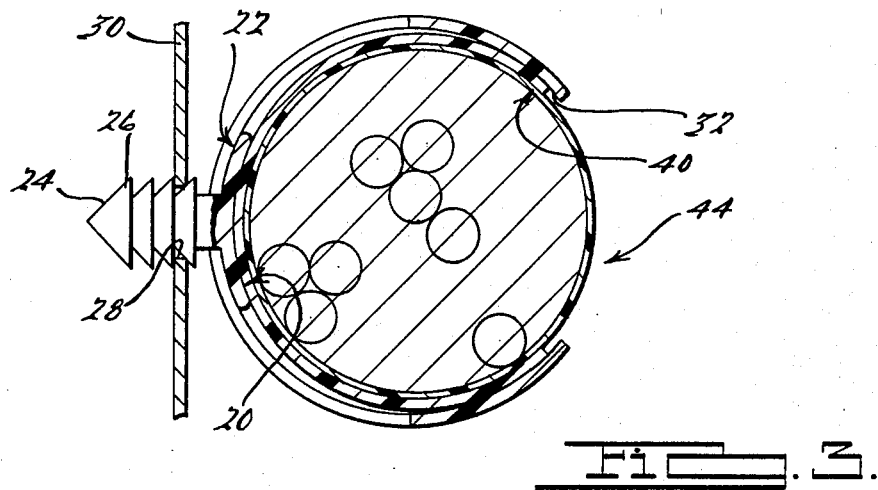
FIG. 3 is a cross-sectional view of the bracket of FIG. 1 taken along lines III—III of FIG. 2 showing the bracket of the present invention installed in a panel.

Turning now to the drawings and in particular to FIG. 1, the adjustable mounting bracket 10 of the present invention is illustrated as including a locating member 12, an adjusting member 14 and a backing member 16. The mounting bracket 10 is illustrated in the following Figures as providing adjustable mounting for an electrical cable such as an automotive wiring harness, but it will be appreciated by those skilled in the art that the mounting bracket 10 may be advantageously employed for mounting on other panels and may be used to mount other types of flexible conduit. It will also be appreciated as the description progresses that while the preferred embodiment contemplates a bracket 10 including each of the three named members, the mounting adjustability essential to the invention bracket 10 may be achievable in an embodiment which includes only the locating member 12 and the adjusting member 14. It is also illustrated in the preferred embodiment of FIG. 1 that the locating member 12 and the backing member 16 may be joined to the adjusting member 14 through strap portions indicated at 18 effecting a hinge-like interconnection as may best be seen in FIGS. 2, 4 and 5. Joining the members 12, 14, 16 with the strips 18 facilitates the fabrication of the adjusting bracket 10 as a unitary structure in a plastic molding process and provides ease in handling the two or three components of the bracket 10 at their point of use at the automotive assembly plant. Only one part must be identified, stored and handled, not two or three parts.

It will be understood that the length of the hinge strips 18 may be chosen to provide gross limits on the relative movement of the locating member 12, adjusting member 14, and backing member 16 with respect to one another or the strips 18 may be cut at assembly within the teaching of the present invention.

The locating member 12 is formed as an elongated strip having an inner arcuate surface 20 and an outer arcuate surface 22. A barbed fastener 24 having a plurality of retrorse fins 26 extends perpendicularly from the outer arcuate surface 22 to engage an aperture 28 formed through a panel 30 in snap-fit rotatable relationship, as may best be seen in FIG. 3.

Figure 4:
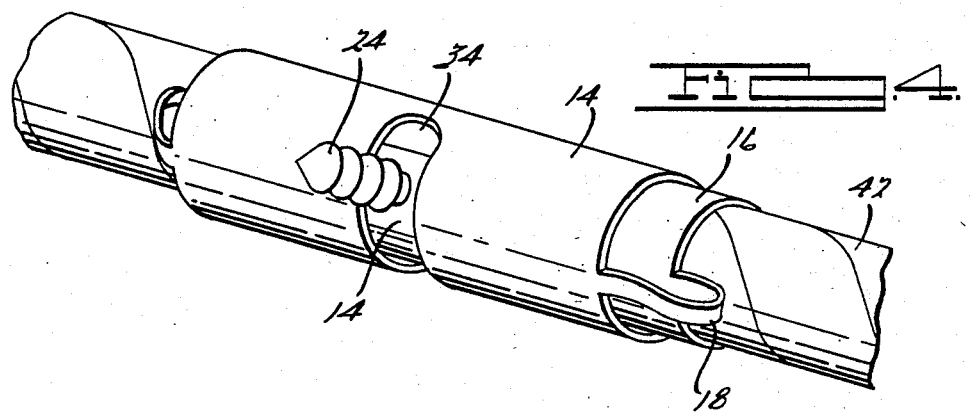
FIG. 4 is a perspective view of the bracket of FIG. 1 illustrating relative movement between portions of the bracket.
Figure 5:
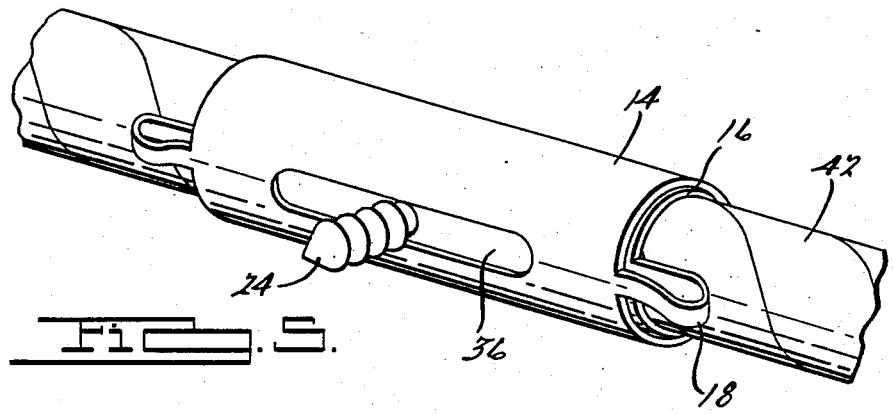
FIG. 5 is a perspective view similar to FIGS. 1 and 4 illustrating an alternative configuration of the invention bracket.

The adjusting member 14 is formed as a substantially cylindrical member having an inner arcuate surface 32 which conforms to the outer arcuate surface 22 of the locating member 12 to permit sliding engagement therebetween. Either a circumferentially extending slot 34 as indicated in FIGS. 1, 2 and 4 or an axially extending slot 36, as illustrated in FIG. 5, is formed through the wall of the adjusting member 14 for receiving the barb 24 of the locating member 12.

In the preferred embodiment illustrated the backing member which is also a partially portion of a cylinder includes an outer surface 38 slidingly received on the inner surface 32 of the adjusting member 14. It includes an arcuate inner surface 40 for receiving outer surfaces of a conduit such as a wiring harnes illustrated as the cable portion indicated at 42 in FIGS. 2, 4 and 5. The cable receiving function of the inner surface 40 of the backing member 16 is supplied by the inner surface 32 of the adjusting member 14 in embodiments in which a backing member 16 is not utilized. The partially cylindrical adjusting member 14 and backing member 16 define an arcuate opening 44 as may best be seen in FIG. 3 smaller than the diameter of the cable portion 42 to effect receiving the cable portion 42 in snap-fit relationship as the molded plastic members 14, 16 flex outwardly. After complete assembly to the position of FIG. 3, closure of the opening 44 may be effected through application of tape or other known manually or automatically applied closure devices.

To form the bracket 10 of the preferred embodiment of FIG. 1 in which the locating member 12, adjusting member 14, the backing member 16 are hingedly connected by strips 18, the locating member is folded over to insert the barb 24 through the circumferentially extending slot 34 (or the axially extending slot 36 of FIG. 5) and the backing member 16 is folded over to engage the inner surface 20 of the locating member 12, as may best be seen in FIG. 3. The protruding barb 24 may then be inserted through the aperture 28 in the body panel 30 to rotatably mount the bracket 10. When the cable portion 42 is assembled into the bracket to the position shown in FIG. 3 through the opening 44, adjustable movement of portions of the flexible cable portion 42 is afforded in the following manner: circumferential movement with respect to the panel 30 is effected by the rotative movement of the adjusting member 14 and the backing member 16 with respect to the locating member 12, the movement being limited by the length of the circumferentially extending slot 34. Axial movement of cable portions 44 is accomplished either through provision of an axially extending slot as indicated in FIG. 5 which limits the travel of the adjusting member with respect to the locating member or as is indicated in FIG. 4 or through relative movement between the locating member 12 and the backing member 16.

While only certain embodiments of the adjustable bracket of the present invention have been described, others may be possible without departing from the scope of the following claims.

I claim:

1. A bracket for adjustably mounting an elongated flexible conduit to a panel comprising:
   a elongated locating member,
   an elongated adjusting member hingedly connected to the locating member and foldable with respect thereto into a position intermediate the locating member and the panel, slidably movable with respect thereto, having surfaces formed thereon for receiving a portion of the conduit in partially surrounding relationship and including a through aperture; and
   attaching means carried with the locating member and extending through the adjusting member aperture into mounting engagement with the panel.

2. A bracket as defined in claim 1 wherein the locating member and the adjusting member are integrally molded, hingedly interconnected plastic members.

3. A bracket for adjustably mounting an elongated flexible conduit to a panel comprising:
   a elongated locating member,
   an elongated adjusting member hingedly connected to the locating member and foldable with respect thereto into a position intermediate the locating member and the panel, slidably movable with respect thereto, having surfaces formed thereon for receiving a portion of the conduit in partially surrounding relationship and including an axially extending slot formed therethrough; and
   attaching means carried with the locating member and extending through the adjusting member slot into mounting engagement with the panel.

4. A bracket for adjustably mounting an elongated flexible conduit to a panel comprising:
   a elongated locating member,
   an elongated adjusting member hingedly connected to the locating member and foldable with respect thereto into position intermediate the locating member and the panel, slidably movable with respect thereto, having surfaces formed thereon for receiving a portion of the conduit in partially surrounding relationship and including a circumferentially extending slot formed therethrough; and
   attaching means carried with the locating member and extending through the adjusting member slot into mounting engagement with the panel.

5. A bracket for adjustably mounting an elongated flexible conduit to a panel comprising:
   a elongated locating member,
   an elongated adjusting member hingedly connected to the locating member and foldable with respect thereto into a position intermediate the locating member and the panel, slidably movable with respect thereto and including a through aperture;
   attaching means carried with the locating member and extending through the adjusting member aperture into mounting engagement with the panel; and
   an elongated backing member hingedly connected to the adjusting member and foldable with respect thereto into a position wherein the backing member is received in axial and circumferential sliding relationship within the adjusting member and having surfaces formed thereon for receiving a portion of the conduit in partially surrounding relationship.

6. A bracket as defined in claim 5 wherein the locating member, the adjusting member and the backing member are integrally molded, hingedly interconnected plastic members.

7. A bracket for adjustably mounting an elongated flexible conduit to a panel comprising:
   a elongated locating member,
   an elongated adjusting member hingedly connected to the locating member and foldable with respect thereto into a position intermediate the locating member and the panel, slidably movable with respect thereto and including a circumferentially extending slot formed therethrough;
   attaching means carried with the locating member and extending through the adjusting member slot into mounting engagement with the panel; and
   an elongated backing member hingedly connected to the adjusting member and foldable with respect thereto into a position wherein the backing member is received in axial and circumferential sliding relationship within the adjusting member and having surfaces formed thereon for receiving a portion of the conduit in partially surrounding relationship.

8. A bracket as defined in claim 7 wherein the locating member, the adjusting member and the backing member are integrally molded, hingedly interconnected plastic members.

9. A bracket as defined in claim 8 wherein the panel includes means defining an aperture therethrough and the attaching means comprises a barb portion integrally formed with the locating member and having retrorse fins formed thereon for snap fit engagement in the panel aperture.

10. A bracket for adjustably mounting an elongated conduit to a panel comprising:
   a elongated locating member,
   an elongated adjusting member hingedly connected to the locating member and foldable with respect thereto into a position intermediate the locating member and the panel and slidingly movable with respect thereto and having surfaces formed thereon for receiving a portion of the conduit in partially surrounding relationship and including a through aperture; and
   attaching means carried with the locating member and extending through the adjusting member aperture into axially fast, rotatable mounting engagement with the panel.

11. A bracket for adjustably mounting an elongated conduit to an automotive body panel comprising:
   means defining an aperture in the body panel;
   a elongated locating member,
   an elongated adjusting member hingedly connected to the locating member and foldable with respect thereto into a position intermediate the locating member and the body panel and slidingly movable with respect thereto and having surfaces formed thereon for receiving a portion of the conduit in partially surrounding relationship and including a through aperture; and
   a mounting barb carried with the locating member and extending through the adjusting member aperture into axially fast, rotatable mounting engagement in the body panel aperture.

* * * * *